(12) United States Patent
Song et al.

(10) Patent No.: US 8,304,089 B1
(45) Date of Patent: Nov. 6, 2012

(54) METALLIC NANOWIRE NETWORKS

(75) Inventors: Yujiang Song, Albuquerque, NM (US); John A. Shelnutt, Tijeras, NM (US)

(73) Assignee: Sandia Corporation, Albuquerque, NM (US)

( * ) Notice: Subject to any disclaimer, the term of this patent is extended or adjusted under 35 U.S.C. 154(b) by 801 days.

(21) Appl. No.: 11/955,954

(22) Filed: Dec. 13, 2007

(51) Int. Cl.
*B82B 1/00* (2006.01)
*B82B 3/00* (2006.01)

(52) U.S. Cl. .......... 428/605; 977/762; 977/895; 75/371

(58) Field of Classification Search ................. None
See application file for complete search history.

(56) References Cited

U.S. PATENT DOCUMENTS 6,858,318 B2   2/2005   Kogiso et al.
7,001,669 B2   2/2006   Lu et al.

OTHER PUBLICATIONS

George S. Attard et al, "Liquid-Crystal Templates for Nanostructured Metals" Angew. Chem. Int. Ed. Engl. 1997, vol. 36, No. 12, pp. 1315-1317.
Tsuyoshi Kijima et al, "Noble-Metal Nanotubes (Pt, Pd, Ag) from Lytropic Mixed-Surfactant Liquid-Crystal Templates", Angew. Chem. Int. Ed. 2004, vol. 43, pp. 228-232.
Sichu Li et al, "The use of organic templates to develop biomimetic chain structures of magnetic nanoparticles", Journal of Applied Physics, vol. 87, No. 9, 2000, pp. 6211-6213.
M. P. Pileni et al, "Mesostructured Fluids in Oil-Rich Regions: Structural and templating Approaches", American Chemical Society, Langmuir, 2001, vol. 17, pp. 7476-7486.
Synthesis of Platinum Nanowire Networks Using a Soft Template Yujiang Song, Robert M. Garcia, Rachel M. Dorin, Haorong Wang, Yan Qiu, Eric N. Coker, William A. Steen, James E. Miller, and John A. Shelnutt Nano Lett., ASAP Article 10.1021/n10719123 S1530-6984(07)01912-1 Web Release Date: Nov. 14, 2007 http://pubs.acs.org/cgi-bin/asap.cgi/nalefd/asap/pdf/n10719123.pdf.
George S. Attard, et al, "Mesoporous Platinum Films from Lyotropic Liquid Crystalline Phases", Science, vol. 278, 838 (1997).
I. Lisiecki et al, "Structural investigations of copper nanorods by high-resolution TEM", Physical Review B, vol. 61, No. 7 2000, pp. 4968-4974.
Supporting Information for "Synthesis of Platinum Nanowire Networks Using a Soft Template," Yujiang Song, Robert M. Garcia, Rachel M. Dorin, Haorong Wang, Yan Qiu, Eric N. Coker, William A. Steen, James E. Miller, and John A. Shelnutt http://pubs.acs.org/subscribe/journals/nalefd/suppinfo/n10719123/n10719123si20071023_063429.pdf.

*Primary Examiner* — Jennifer McNeil
*Assistant Examiner* — Adam Krupicka
(74) *Attorney, Agent, or Firm* — Carol I. Ashby

(57) ABSTRACT

A metallic nanowire network synthesized using chemical reduction of a metal ion source by a reducing agent in the presence of a soft template comprising a tubular inverse micellar network. The network of interconnected polycrystalline nanowires has a very high surface-area/volume ratio, which makes it highly suitable for use in catalytic applications.

16 Claims, 6 Drawing Sheets

Combine aqueous solution of ionic metal source with organic solvent and surfactant Agitate to form soft template and extract ionic metal reactant into aqueous channels of soft template in organic/surfactant phase Add strong reducing agent to form metallic nanowire structure by reduction of ionic metal reactant to metal.

METALLIC NANOWIRE NETWORKS

The United States Government has rights in this invention pursuant to Department of Energy Contract No. DE-AC04-94AL85000 with Sandia Corporation.

BACKGROUND OF THE INVENTION

This invention relates to a metallic nanowire network with a very high surface-to-volume ratio. The ability to form metallic nanowire networks with high surface-to-volume ratios is very desirable for catalytic applications where the catalytic metal is often expensive; significant economic advantage can be obtained by maximizing the fraction of metal atoms accessible to chemical reactants. Platinum and palladium are two examples of highly versatile catalytic metals that are expensive and would benefit from being formed into catalytic materials comprising nanowire networks. For example, nanostructured platinum may be important as an electrocatalyst in proton-exchange-membrane fuel cells, as a catalyst in automotive applications, as a catalyst for industrial reactions, and as a catalyst in solar water-splitting devices. For such applications, it is desirable to have a very high surface-to-volume ratio while also having the catalytic material be readily recoverable when the catalytic process is completed.

Y. Lu and D. Wang, U.S. Pat. No. 7,001,669, report metal-containing nanostructured films by electrodepositing a metal-containing composition within the pores of a mesoporous silica template to form a metal-containing silica nanocomposite. The nanocomposite is annealed to strengthen the deposited metal-containing composition. The silica is then removed from the nanocomposite, e.g., by dissolving the silica in an etching solution to provide a self-supporting metal-containing nanostructured film. The nanostructured films have a nanowire or nanomesh architecture depending on the pore structure of the mesoporous silica template used to prepare the films.

M. Kogiso and T. Shimizu, U.S. Pat. No. 6,858,318, reports a nanowire comprising only metal having an average length of 1 micrometer or more and a method of manufacturing this wire. The method of manufacturing a metal nanowire comprises the step of reducing a nanofiber comprising a metal complex peptide lipid formed from a two-headed peptide lipid comprising valine residues and a metal ion using a reducing agent relative to the two-headed peptide lipid. The method provides a metal nanowire having an averaged diameter of 10-20 nm and average length of 1 micrometer or more; the preferred metal is copper. A nanowire network does not form.

T. Kijima and coworkers report the reduction of metal salts confined to lyotropic mixed surfactant liquid crystals to form Pt, Pd, and Ag nanotubes of 6-7 nm outer diameter. Equimolar amounts of medium and large surfactant molecules are combined into a hexagonal array of cylindrical rod-like micelles approximate 6.9 nm in diameter and the aqueous outer shell of the rod-like micelles is so thick that the reduced metal grows into nanotubes separately within the aqueous shell (T. Kijima, T. Yoshimura, M. Uota, T. Ikeda, D. Fujikawa, S. Mouri, and S. Uoyama, "Noble-Metal Nanotubes (Pt, Pd, Ag) from Lyotropic Mixed-Surfactant Liquid-Crystal Templates," Angew. Chem. Int. Ed. vol. 43 (2004) pp. 2228-2232).

Attard and coworkers report the formation of microporous platinum particles with a hexagonal nanostructure consisting of cylindrical pores separated by Pt walls using a lyotropic liquid crystalline phase template (G. S. Attard, C. G. Göltner, J. M. corker, S. Henke, and R. H. Templer, "Liquid-Crystal Templates for Nanostructures Metals," Angew. Chem. Int. Ed. Engl. Vol 36 (1997) pp. 1315-1317). The ternary system consisting of a nonionic surfactant (octaethyleneglycol monohexadecyl), $H_2PtCl_6$ or $(NH_4)_2PtCl_4$, and water forms a lyotropic liquid crystal. Reduction of the Pt(II) employs either a metal less noble that Pt (Fe, Zn, Mg) or hydrazine.

Attard and coworkers also report electrodeposition of metallic mesoporous platinum films from lyotropic liquid crystalline plating mixtures. The plating mixtures were ternary systems consisting of a nonionic surfactant (octaethyleneglycol monohexadecyl), $H_2PtCl_6$, and water. Reduction of platinum salts dissolved within the aqueous domains of this hexagonal mesophase lead to platinum whose nanostructure is a cast of the liquid-crystalline phase architecture (G. S. Attard, P. N. Bartlett, N. R. B. Coleman, J. M. Elliott, J. R. Owen, and J. H. Wang, "Mesoporous Platinum Films from Lyotropic Liquid Crystalline Phases," Science, Vol. 278 (1997) pp. 838-840.

S. Li and coworkers report the formation of an entangled chain network comprised of connected spherical Fe particles in the size range 15-20 nm by reduction of ferrous chloride in a percolating water structure of a gel phase of lecithin/AOT/isooctane/water where the gel phase may be made up of bicontinuous channels of water and the hydrocarbon phase. The particles themselves are spherical and do not take on the morphology of extended structures of the gel (S. Li, V. T. John, G. C. Irvin, B. Simmons, G. D. McPherson, and W. Zho, "The use of organic templates to develop biomimetic chain structures of magnetic nanoparticles," J. Appl. Phys vol. 87 (2000) pp 6211-6213).

A mixture of nanospheres and nanorods of Cu have been formed by reduction of $Cu(AOT)_2$ by hydrazine in the interconnected cylinders phase of the $Cu(AOT)_2$/isooctane/water system, which is a surfactant/organic solvent/water ternary system (M. P. Pileni, "Mesostructured Fluids in Oil-rich Regions: Structural and Templating approaches," Langmuir Vol. 17 (2001) pp. 7476-7486). The interconnected cylinders phase corresponds to the bicontinuous phase. A nanowire network does not form.

BRIEF DESCRIPTION OF THE DRAWINGS

The accompanying drawings, which are incorporated in and form part of the specification, illustrate some embodiments of the present invention and, together with the description, serve to explain the principles of the invention.

DETAILED DESCRIPTION OF THE INVENTION

Figure 1:
FIG. 1 presents a process flowchart for an embodiment of this invention.
Figure 1:
Figure 2:
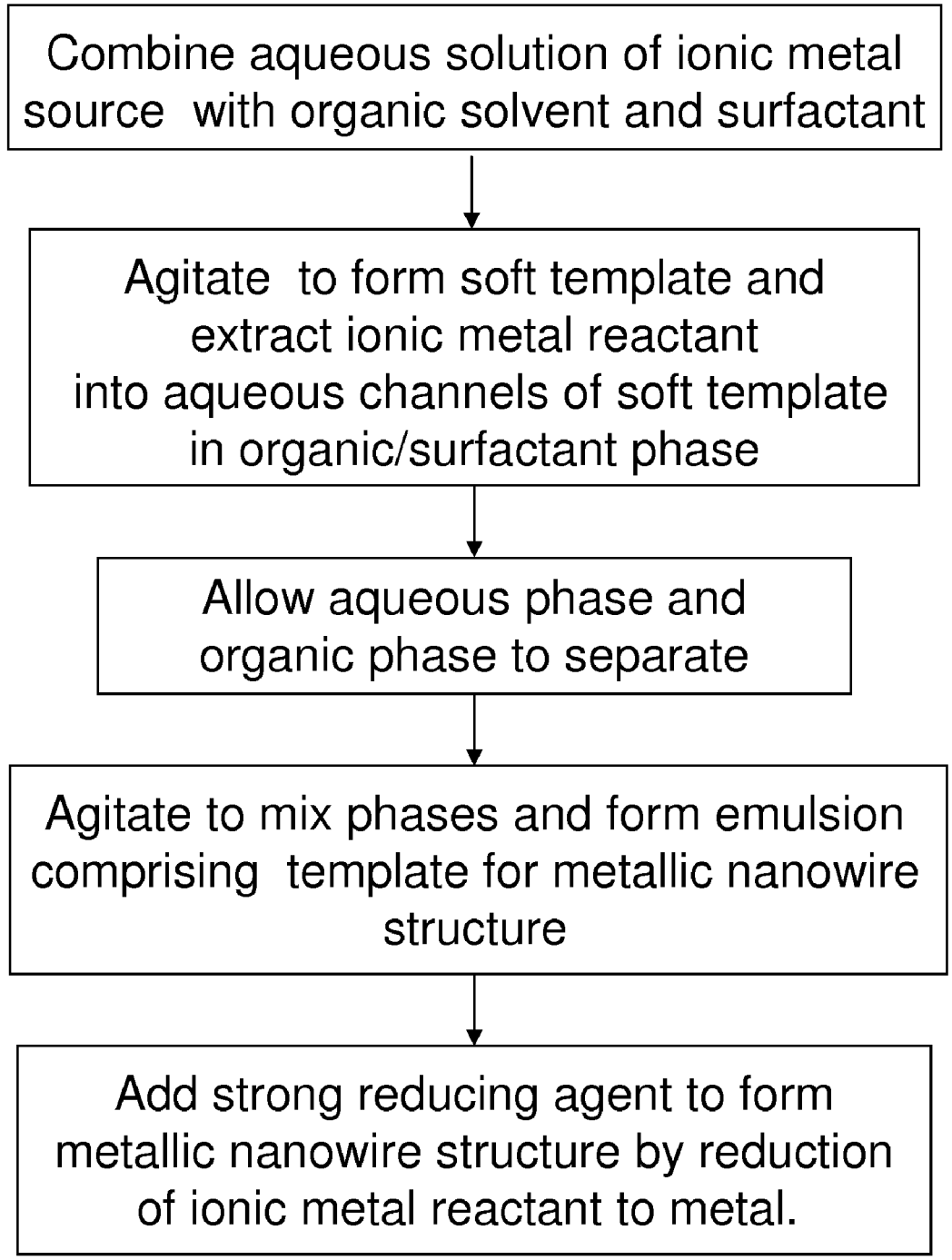
FIG. 2 presents a process flowchart for another embodiment of this invention.

This invention comprises a metal nanowire network and a method for forming the network. A soft template for forming the metal nanowire network comprises a network of swollen inverse micelles comprising a surfactant, water, and an organic solvent. The soft template is formed by agitation of a mixture of an organic solvent, a surfactant, and water containing an ionic metal source species to provide an ionic metal reactant. The ionic metal reactant (metal ion or metal ion complex) is extracted from the water phase and stabilized within the aqueous channels of the soft template by interaction with the polar headgroup of the surfactant lining the aqueous channels. The in-channel metal reactant is reduced by a strong reducing agent within the aqueous channels to form a substantially continuous metal nanowire deposit. The continuous metal nanowires form a metallic nanowire network or mesh corresponding to the pattern of the connecting aqueous channels of the soft template. FIGS. 1 and 2 present the process for two embodiments of this invention Surfactants are amphiphiles that solubilize water and organic solvents or oils to form either isotropic phases (for example, microemulsions and sponge phases) or lyotropic liquid crystalline phases (for example, lamellar phases and hexagonal phases). The term microemulsion generally describes a stable or metastable fluid surfactant/organic liquid/water mixture in which the water and organic liquid regions are separated and the surfactant molecules organize as monolayers at the water/organic liquid interfaces. The terms oil-in-water (O/W) and water-in-oil (W/O) are used to include systems where the organic liquid represented by the term oil is not necessarily a chemical entity commonly regarded as an "oil" but can be another type of organic liquid. For the purposes of this invention, the term "oil" may be used in this context to refer to a non-oil organic compound such as an organic solvent that can form a microemulsion with water and a surfactant. Microemulsions can exist over a wide range of oil and water concentrations. For relatively small fractions of water in oil or oil in water, approximately spherical swollen inverse micelles or swollen micelles form, respectively. When approximately equal fractions of water and oil are present, oil and water regions each form separate connected random networks with the surfactant molecules forming a continuous film between the oil and water domains. One such phase is the bicontinuous phase. One type of network structure that can be present in an organic-solvent-rich system is a network of swollen tubular inverse micelles. Such networks can be of a worm-like type. Studies of the phase-vs.-concentration properties of three-component ionic microemulsions have been studied for a number of combinations; see, for example, S. J. Chen, D. Fennell Evans, and B. W. Ninham, "Properties and Structure of Three-Component Ionic Microemulsions," J. Phys. chem. Vol. 88 (1984) pp. 1631-1634.

A network of swollen tubular inverse micelles comprises a disordered, connected surfactant film separating the water and organic solvent phases. The structure generally consists of interconnected continuous channels of water or organic solvent (interpenetrating networks of organic-solvent-containing and water-containing channels with the interface populated by surfactant molecules with polar headgroups in the water channel and hydrophobic tail in the organic channel). While the details of the structures of the interconnected channels may vary, the structural dimensions of such channels are generally between about 5 and 100 nm. Swollen tubular inverse micellar networks can also be prepared where there are a plurality of surfactant species and/or a plurality of compounds serving as the organic-solvent component of the system. The tubular inverse micellar networks serve as removable soft templates for the formation of the metal nanowire network embodiments of this invention.

In embodiments of this invention, surfactant/water/organic solvent concentrations are chose to form a network of swollen tubular inverse micelles. One example of such networks is termed a worm-like inverse micellar network. The metal nanowire network is grown within the aqueous channel of the swollen tubular inverse micellar network. The establishment of a suitable network for a particular combination of surfactant, water, and organic solvent can be determined by methods known to those skilled in the microemulsion art. One technique for identifying the presence of a network comprising continuous aqueous channels involves measuring the electrical conductivity of the surfactant/water/organic-solvent combination, especially when approaching the concentration combination from the organic solvent-rich, non-conductive region of the three-component phase diagram. When in the isolated, approximately spherical inverse micelle region of the phase diagram (higher organic solvent/water ratios), the mixture will be essentially non-conductive. When a phase comprising a network comprising continuous aqueous channels is achieved, there will be a continuous electrically conductive aqueous path through the mixture, which can be measured with standard resistance or conductivity measurement techniques.

The extent of the interconnectivity of the water conduits for a particular surfactant/organic solvent/water combination can be measured with a conductivity measurement (see, for example, G. G. Warr, R. Sen, D. F. Evans, and J. E. Trend, "Microemulsion Formation and Phase Behavior of Dialkyldimethylammonium Bromide Surfactants," J. Phys. Chem. Vol 92 (1988) pp. 774-783). For embodiments of this invention, the surfactant/organic solvent/water ratios are selected to favor formation of the interconnecting channels or water conduits.

The selection of a suitable combination of surfactant and ionic metal source is influenced by the electrical charges of each. For example, when forming Pt nanowires, a useful Pt(II) source in some embodiments is the $PtCl_4^{2-}$ ion. Another useful source of Pt(II) is the $PtCl_6^{2-}$ ion. The Pd analogs may also be used. To facilitate penetration and/or stabilization of the negatively charged metal ion throughout the aqueous channels of the network template, a cationic surfactant may be used. A cationic surfactant that has been employed in some embodiments of the invention is the surfactant CTAB (cetyltrimethylammonium bromide). A suitable concentration of CTAB is determined by its ability to form a phase comprising a network of continuous aqueous channels with a particular water/organic solvent combination and by its ability to produce a substantially complete transfer of the metal ion complex from the water phase into the organic solvent phase where the swollen inverse micellar network is present. Other cationic surfactants may also be used in embodiments with a negatively charged metal ion source. Some examples of other suitable cationic surfactants that may be used include but are not restricted to (1-octyl)trimethylammonium bromide, (1-decyl)trimethylammonium bromide, dodecyltrimethylammonium bromide, tetradecyltrimethylammonium bromide, and octadecyltrimethylammonium bromide. Counter ions other than bromide ions may also be used; some examples include but are not restricted to fluoride, chloride, iodide, sulfite, sulfate, and phosphate ions. Some additional suitable cationic surfactants are variations of the preceding. For example, one or more of the methyl groups bound to the nitrogen atom can be replaced by carbon chains with two or more carbons. The carbon chains chemically bonded to the nitrogen atom can be the same kind or different kinds. The carbon chains chemically bonded to the carbon atom can also be linear, branched or cyclic. The term alkyl group is employed for the purpose of this invention to include alkenyl groups.

Essentially, a surfactant capable of forming a tubular network comprising continuous aqueous channels in combination with an organic solvent and water and having a headgroup capable of electrostatically attracting or binding with the ionic metal reactant species (metal ion or metal ion complex) to facilitate extraction of the ionic metal reactant into the aqueous channels and optionally with an ionic charge opposite in sign to that of the ionic metal reactant may be used in different embodiments of this invention.

In the demonstrated embodiments of this invention, chloroform was used as the organic solvent. However, other organic solvents may also be used. Key features of the surfactant/organic solvent/water combinations that can be used for the practice of this invention are combinations that form microemulsion regions that are tubular inverse micellar networks and where the surfactant polar head groups lining the aqueous channels of the tubular inverse micellar network interact sufficiently strongly with the ionic metal reactant that the metal ion can be preferentially segregated within the aqueous channels of the tubular inverse micellar networks following extraction from the water phase. Other systems include but are not restricted to CTAB/(chloroform and benzene)/water, CTAB/(chloroform and toluene)/water, CTAB/(chloroform and dichloromethane)/water, and CTAB/(chloroform+(benzene and/or toluene and/or dichloromethane)/water, where the organic solvents employed are miscible with each other. Dichloromethane may be used in place of chloroform. Alkanes and alkenes that are liquids in the temperature range from approximately 0 to approximately 100° C. at pressures from approximately 1 atmosphere to approximately 10 atmospheres may be employed.

The reductant employed for the demonstrated embodiments of this invention was $NaBH_4$. It is a strong reductant that provides a hydride ($H^-$) species as the reducing agent. Other strong hydride reductants including but not limited to $LiAlH_4$, $LiBH_4$, $KBH_4$, $NaH$, $KH$, and $CaH_2$ may also be used.

A journal article and its supporting information reporting some embodiments of this invention, Y. Song, R. M Garcia, R. M. Dorin, H. Wang, Y Qiu, E. N. Coker, W. A. Steen, J. E. Miller, and J. A. Shelnutt, "Synthesis of Platinum Nanowire Networks Using a Soft Template," Nano Lett., ASAP Article 10.1021/nl0719123 S1530-6984(07)01912-1 Web Release Date: Nov. 14, 2007, is incorporated herein by reference.

Figure 3:
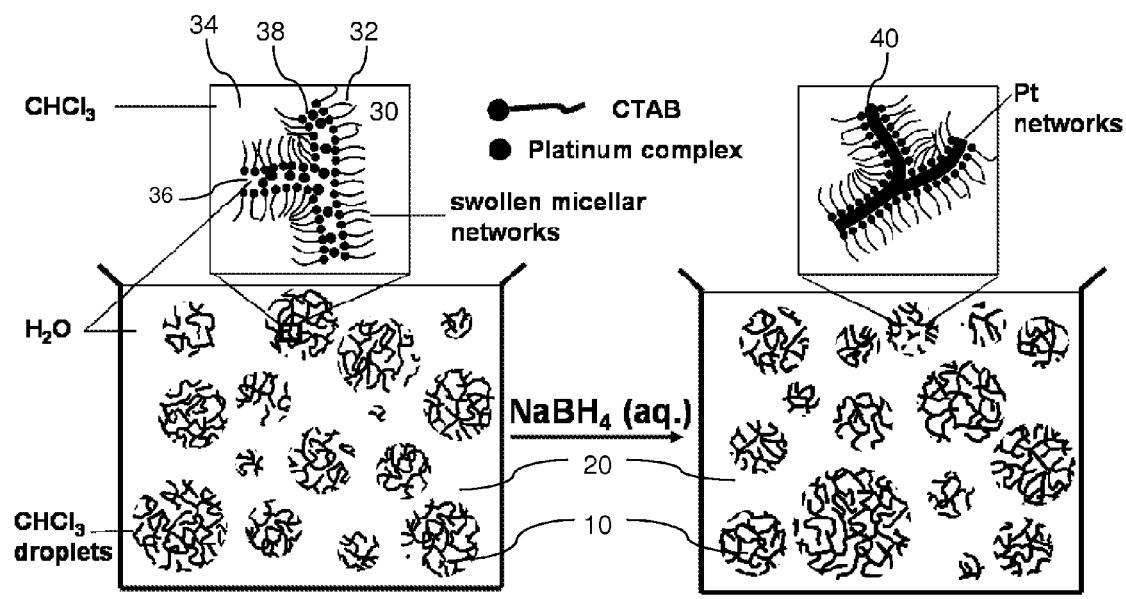
FIG. 3 schematically illustrates an embodiment of the process of forming the metal nanowire networks.

FIG. 3 partially illustrates an embodiment of this invention. Droplets of chloroform (10) are dispersed in water (20). The chloroform droplets (10) contain swollen micellar networks (30) comprising surfactant molecules (32) lining the interface between chloroform regions (34) and aqueous channels (36). Within the aqueous channels (36) are ionic metal reactants (38), such as a $PtCl_4^{2-}$ complex. An aqueous solution of a strong reducing agent, such as $NaBH_4$, is added. The Ionic metal reactant species (38) are reduced to form metal nanowires (40) that conform to the shape of the soft template provided by the aqueous channels of the swollen micellar network.

Figure 4:
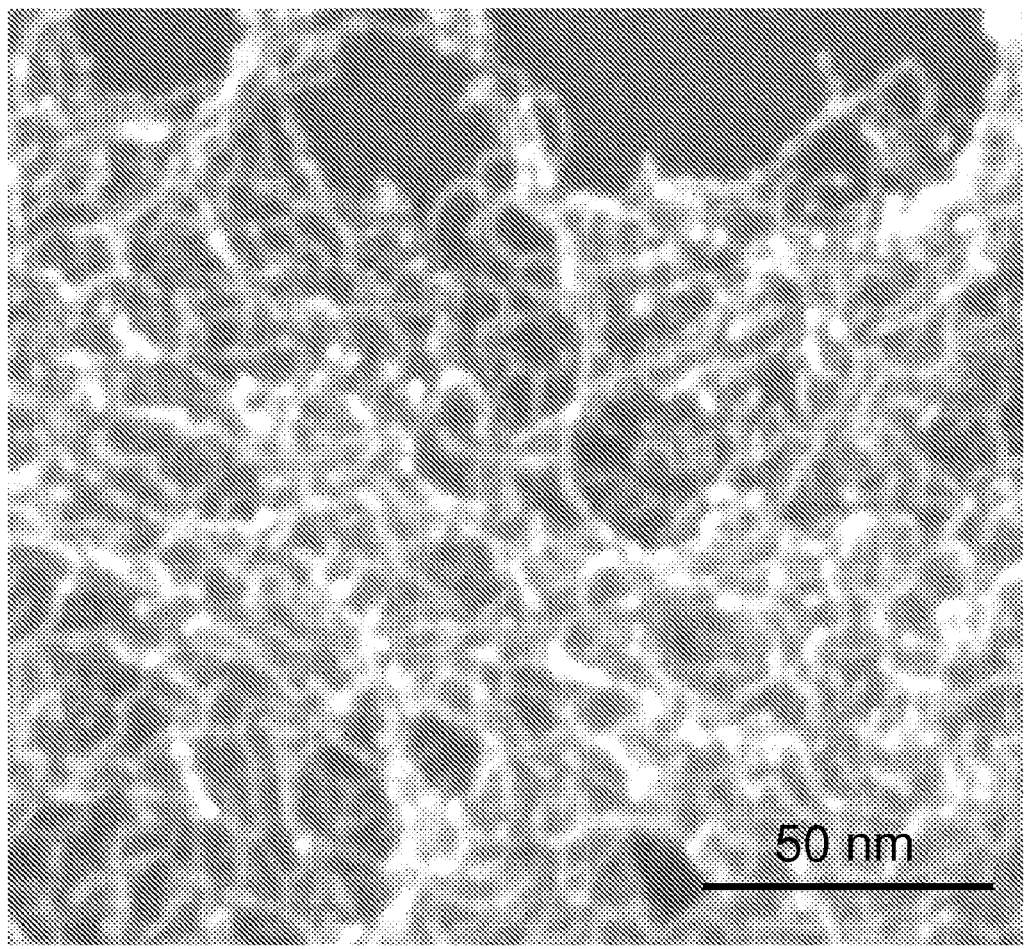
FIG. 4 presents a scanning electron micrograph (SEM) of a Pt nanowire network.
Figure 5:
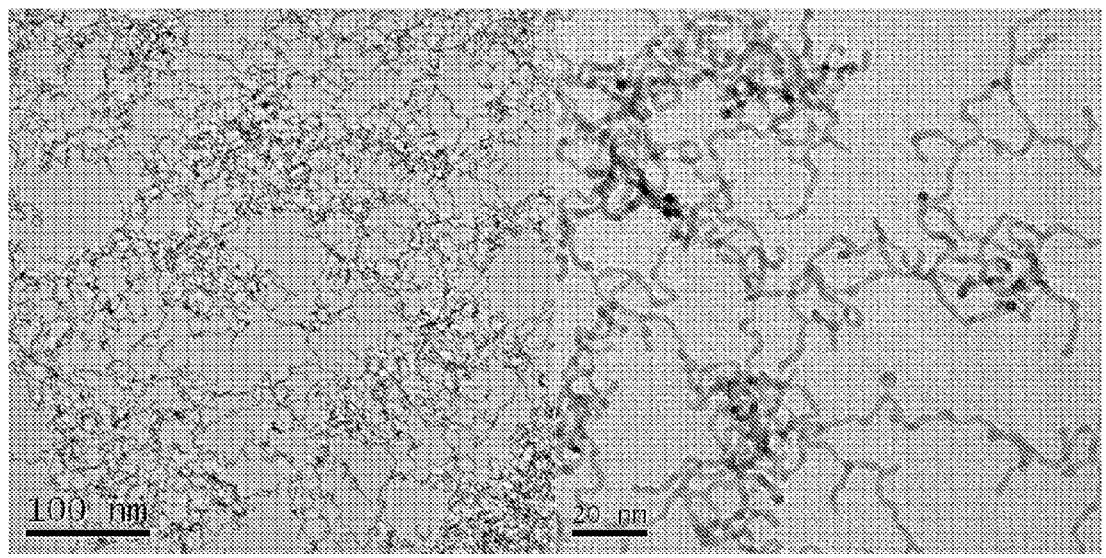
FIG. 5 presents transmission electron micrographs (TEMs) of a Pt nanowire network.
Figure 6:
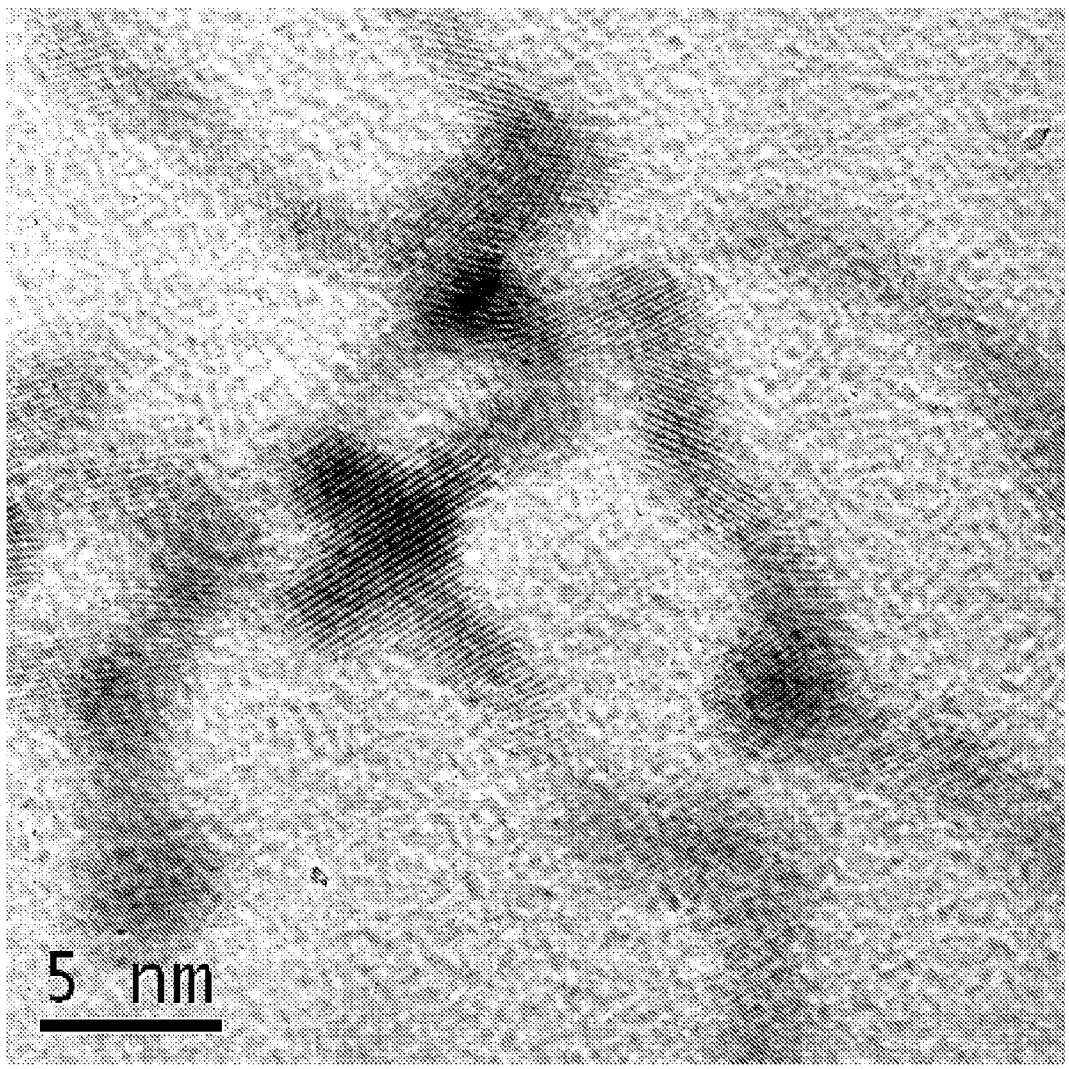
FIG. 6 presents a high-resolution TEM (HRTEM) of a nanowire network showing the continuous polycrystalline character of the nanowires.

In one embodiment of this invention, 10 mL of 20-mM aged $K_2PtCl_4$ aqueous solution was mixed with 40-mM cetyltrimethylammonium bromide (CTAB) in chloroform (10 mL). The ratio of the aqueous and chloroform solutions and the amount of surfactant were chosen to form networks of interconnected worm-like inverse micellar structures (a bicontinuous phase). The resistances measured for two systems comprising 2-mM CTAB/water/chloroform (which forms spherical micelles) and 40-mM CTAB/water chloroform (which forms a bicontinuous phase) were essentially infinite (higher than the instrumental resolution) and 3.0 MO, respectively. (The CTAB concentration refers to the concentration of CTAB in chloroform used in the preparation of the emulsion.) The greatly reduced resistivity of the bicontinuous phase is indicative of the presence of the network of interconnected water channels. For this embodiment, the surfactant (CTAB) concentration was selected to be twice that of the platinum complex. After approximately 10 minutes or more of stirring, during which time the $PtCl_4^{-2}$ was extracted from the water phase into the aqueous channels of the bicontinuous phase, the stirring was discontinued to allow the water and chloroform phases to separate from each other. The worm-like inverse micellar networks containing the metal ions are substantially in the chloroform phase. In some embodiments, the separation step was carried on for approximately two hours. Visual or spectroscopic inspection showed by the loss of color in the water phase and the appearance of color in the chloroform phase that the Pt complex had been transferred from the water phase into the aqueous channels of the bicontinuous phase. This phase separation step is not an essential step in the process; addition of the reducing agent to the mixed water/chloroform phases without an intermediate phase separation step may also be done in embodiments of this invention. Other times for stirring and optionally separating may also be used provided the Pt ion transfer into the aqueous channels is sufficient to reduce the Pt concentration outside the channels to a level where reduction of Pt(II) outside the aqueous channels is not significant. For Pt(II) reduction, 80 mL of water and 10 mL of 300-mM sodium borohydride was added while the mixture was being stirred at a speed of 1000 rpm. The mixture turned black and bubbles were generated, indication the reduction of the Pt(II) complex to nanoscale Pt metal. FIG. 3 schematically presents an embodiment of the invention. An SEM of the product of this reaction is shown in FIG. 4. The Pt nanowires are substantially uniform in diameter and form an extended network of interconnected wire segments that form a 3-dimensional porous mass. TEMs of the Pt nanowire network presented in FIG. 5 show the substantially uniform diameter of the nanowires made by this process. The average cross-sectional diameter is 2.2±0.3 nm as determined by manually measuring 100 randomly selected sections of the wires. The nanowires have substantially uniform diameter with the ratio of the standard deviation to the average diameter of 13.6%. A diameter is defined as being substantially uniform when the ratio of the standard deviation to the average diameter is 20% or less. A high-resolution TEM (HRTEM) of the nanowire network shows the nanowires to be composed of polycrystalline metal (FIG. 6).

Synthesis of the nanowire networks was carried out on a larger scale. The reaction procedures were as listed above with the quantities of the reagents increased accordingly (75 mL of 40 mM CTAB in chloroform, 75 mL of aged platinum complex, 600 mL of water, and 75 ml of 300 mM $NaBH_4$ in water). After reaction, the mixture was distilled to remove the chloroform and then evaporated to remove water over a period of several days in an oven at 65° C. The dried materials were resuspended by mild sonication and stirring for 15 min. The metal nanowire network was cleaned by a serious of centrifugation/resuspension steps with water, and then dried. A second series of centrifugation/resuspension using chloroform was performed, followed by oven drying. Surface area measurements (by $N_2$ absorption) performed on this material showed a surface area of 53 $m^2/g$. Pore sizes of approximately 2 to 20 nm lateral dimensions were determined by surface area measurements.

The nanowire networks of embodiments of this invention have very large surface area/volume ratios, making them very cost effective for use as catalysts where the fraction of metal atoms accessible at a surface to serve as a catalyst is important in determining cost effectiveness. For nanowire networks with approximate wire diameters of 1 to 10 nm, assuming approximately cylindrical wire geometry the surface area-to-volume ratio is greater than approximately $1\times10^8$/m.

In another embodiment, Pd nanowire networks were formed when 10 mL of a 20-mM $K_2PdCl_4$ aqueous solution was mixed with 40-mM cetyltrimethylammonium bromide (CTAB) in 10 mL of chloroform while stirring. After at least 10 minutes, stirring was discontinued, and the water and chloroform phases were allowed to separate from each other over a period of two hours. For Pd(II) reduction, this mixture was mixed with 80 mL of water and 10 mL of 300-mM sodium borohydride and stirred at a speed of 1000 RPM.

The cessation of stirring for a period sufficient to allow separation of the water and organic solvent phases is not an essential step in many embodiments of this invention. The allowing of phase separation allows determination of whether the ionic metal reactant (metal ion or metal ion complex) has been substantially extracted into the aqueous channels. Extraction of the ionic metal reactant out of the water phase and into the aqueous channels minimizes the production of random Pt nanoparticles upon addition of the reductant solution. The extent of transfer can be assessed visually and/or by spectroscopic techniques, such as absorption spectroscopy.

In various embodiments, the diameter of the metal nanowire segments can be controlled by controlling the concentration of the metal ion. More highly concentrated solutions form nanowires with larger diameters. For example, in an embodiment where a 1-mM solution of $K_2PtCl_4$ was stirred at a rate of 1000 rpm, the nanowire of the network possessed an average diameter of 1.8±0.3 nm, as determined by manually measuring 100 different sections of the nanowire network. When 20-mM $K_2PtCl_4$ was employed, 2.2±0.3 nm-diameter nanowires resulted.

The stirring conditions can be adjusted in various embodiments to adjust the size of the nodes where adjacent nanowire segments connect. Without stirring, a few nanowires are formed and the majority of the product is 5-10 nm irregular particles. At 200 rpm stirring, more nanowires and fewer and smaller (mostly <5 nm) nanoparticles are formed. The nanoparticles are integrated into the metal nanowire network at nodes. At 700 rpm, the nanowire network is dominant over the Pt nanomaterial; approximately 4-nm knobs are located at some nodal connection points and at the end of some nanowires. At the stirring rate of 1000 rpm, a large quantity of platinum nanowire network is produced without clear evidence of enlargements at the nodal connection points. At 1300 rpm stirring rate, the product is essentially the same as that obtained with 1000-rpm stirring. At the higher stirring rates, extensive tubular inverse micellar network regions are created, providing increased surface area for more efficient diffusion of borohydride and thereby increased rates of reduction of metal complexes throughout the micellar network. This results in the more uniform deposition of metal nanowire segments throughout the aqueous-phase channels of the micellar network.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A metal nanowire network comprising:
   a plurality of metal nanowire segments interconnected at nodes and having a shape that replicates a shape of an aqueous channel network of at least one of a micellar bicontinuous phase and a tubular inverse micelle, wherein the metal nanowire network is formed by the process of:
   combining a surfactant, an organic solvent, and an aqueous solution of an ionic metal reactant;
   forming a plurality of interconnecting aqueous channels in a network of at least one of swollen tubular inverse micelles and a micellar bicontinuous phase in an emulsion comprising the surfactant, the organic solvent, and water;
   extracting the ionic metal reactant into the plurality of interconnecting aqueous channels; and
   reducing the ionic metal reactant to an elemental metal within the plurality of aqueous channels, thereby forming a metal nanowire network.

2. The metal nanowire network of claim 1, wherein the plurality of nanowire segments have a substantially uniform diameter.

3. The metal nanowire network of claim 2, wherein the substantially uniform diameter is between approximately 1 nm and approximately 10 nm.

4. The metal nanowire network of claim 1, wherein the metal nanowire network has a surface-to-volume ratio greater than approximately $1\times10^8$/m.

5. The metal nanowire network of claim 1, wherein a metal comprising the metal nanowire network is selected from the group consisting of Pt and Pd.

6. The metal nanowire network of claim 1, wherein the metal nanowire network comprises polycrystalline metal.

7. The metal nanowire network of claim 1, wherein the network of swollen tubular inverse micelles is a worm-like swollen tubular inverse micelle network.

8. A method for making a metal nanowire network, the method comprising:
   combining a surfactant, an organic solvent, and an aqueous solution of an ionic metal reactant;
   forming a plurality of interconnecting aqueous channels in a network of swollen tubular inverse micelles in an emulsion comprising the surfactant, the organic solvent, and water;
   extracting the ionic metal reactant into the plurality of interconnecting aqueous channels; and
   reducing the ionic metal reactant to an elemental metal within the plurality of aqueous channels, thereby forming a nanowire network comprising, a plurality of metal nanowire segments interconnected at nodes and having a shape that replicates a shape of an aqueous channel network of at least one of a micellar bicontinuous phase and a tubular inverse micelle.

9. The method of claim 8, wherein the ionic metal reactant and headgroups of the surfactant have electrical charges of opposite sign.

10. The method of claim 8, wherein the ionic metal reactant is derived from an ionic metal source species selected from the group consisting of $H_2PtCl_4$, $H_2PtCl_6$, $H_2PdCl_4$, $H_2PdCl_6$, salts of $PtCl_4^{2-}$, salts of $PtCl_6^{2-}$, salts of $PdCl_4^{2-}$, and salts of $PdCl_6^{2-}$.

11. The method of claim 8, wherein the step of reducing employs a hydride reducing agent.

12. The method of claim 11, wherein the hydride reducing agent is selected from the group consisting of $NaBH_4$, $LiBH_4$, $LiAlH_4$, $KBH_4$, NaH, KH, and $CaH_2$.

13. The method of claim 8, wherein the organic solvent is selected from the group consisting of chloroform, dichloromethane, chlorobenzene, carbon tetrachloride, an alkane that is liquid between approximately 0 and approximately 100° C. and between approximately 1 and approximately 10 atmospheres pressure, an alkene that is liquid between 0 and 100° C. and between 1 and 10 atmospheres pressure, toluene, benzene, and miscible mixtures thereof.

14. The method of claim 8, wherein the surfactant comprises a cation of formula $R_1R_2R_3R_4N^+$, wherein $R_1$, $R_2$, $R_3$, and $R_4$ are alkyl groups wherein at least one of $R_1$, $R_2$, $R_3$, and $R_4$ is an alkyl group comprising from 8 carbon atoms up to 18 carbon atoms, and wherein $R_1$, $R_2$, $R_3$, and $R_4$ are selected from the group consisting of linear alkyl groups, branched alkyl groups, and cyclic alkyl groups.

15. The method of claim 8, wherein the surfactant comprises a cation selected from the group consisting of cetyltrimethylammonium ion, (1-octyl)trimethylammonium ion, (1-decyl)trimethylammonium ion, dodecyltrimethylammonium ion, tetradecyltrimethylammonium ion, and octadecyltrimethylammonium ion.

16. The method of claim 8, wherein the organic solvent is chloroform, the surfactant is cetyltrimethylammonium bromide, the ionic metal reactant is selected from the group consisting of $PtCl_4^{2-}$ and $PdCl_4^{2-}$, and wherein the metal ionic reactant is reduced by sodium borohydride.

* * * * *